US012597652B2

(12) United States Patent
Kim et al.

(10) Patent No.: US 12,597,652 B2
(45) Date of Patent: Apr. 7, 2026

(54) NICKEL-METAL HYDRIDE (NiMH) BATTERY RECYCLING

(71) Applicant: ASCEND ELEMENTS, INC., Westborough, MA (US)

(72) Inventors: Kee-Chan Kim, Westborough, MA (US); Matthew Eggert, Westford, MA (US)

(73) Assignee: Ascend Elements, Inc., Westborough, MA (US)

( * ) Notice: Subject to any disclaimer, the term of this patent is extended or adjusted under 35 U.S.C. 154(b) by 713 days.

(21) Appl. No.: 17/957,753

(22) Filed: Sep. 30, 2022

(65) Prior Publication Data

US 2024/0113349 A1 Apr. 4, 2024

(51) Int. Cl.
H01M 10/54 (2006.01)
C22B 3/00 (2006.01)
C22B 7/00 (2006.01)

(52) U.S. Cl.
CPC ............. H01M 10/54 (2013.01); C22B 7/007 (2013.01); C22B 23/043 (2013.01); C22B 23/0453 (2013.01)

(58) Field of Classification Search
CPC .. C01D 5/16; C01G 53/10; C22B 3/08; C22B 7/007; C22B 23/043; C22B 23/0453; H01M 10/30; H01M 10/345; H01M 10/54; Y02P 10/20; Y02W 30/84
See application file for complete search history.

(56) References Cited

U.S. PATENT DOCUMENTS

2014/0308183 A1* 10/2014 Kikuta .................. H01M 10/54
423/140
2021/0391606 A1 12/2021 Wang et al.

FOREIGN PATENT DOCUMENTS

| CN | 108384957 A | 8/2018 |
| CN | 109346741 A | 2/2019 |
| CN | 113461071 A | 10/2021 |
| EP | 2597164 B1 | 9/2016 |

OTHER PUBLICATIONS

International Search Report, PCT/US2022/052127, Jun. 26, 2023, pp. 1-3.
Agarwal, Vivek, et al., "Recycling of spend NiMH batteries: Integration of battery leach solution into primary Ni production using solvent extraction", Jul. 9, 2019, pp. 1-9, Sustainable Materials and Technologies 22, Journal homepage, www.elsevier.com/locate/susmat.

(Continued)

*Primary Examiner* — Brian A Mccaig
(74) *Attorney, Agent, or Firm* — Armis IP Law, LLC

(57) ABSTRACT

Recycling of nickel-metal hydride (NiMH) batteries extracts substantially pure nickel based on adding a leach agent to granular cathode material resulting from agitation of the NiMH batteries to form a leach solution. A pH of the leach solution is maintained for precipitating iron, aluminum and lanthanide rare earth elements (REE) for yielding a nickel solution for forming a cathode material precursor in a recycled battery, often with a high nickel content.

13 Claims, 2 Drawing Sheets

(56) References Cited

OTHER PUBLICATIONS

Delvasto, P., et al., "Processing of spent Ni-MH batteries for the recovery of cobalt, nickel and rare earth elementsbearing materials by means of a chemical and electrochemical sequential process", 2016, pp. 1-5, IOP Publishing, Journal of Physics: Conference Series 687.

Liu, Fupeng, et al., "Synergistic Recovery of Valuable Metals from Spend Nickel-Metal Hydride Batteries and Lithium-Ion Batteries", 2019, pp. 16103-16111, Sustainable Chemistry & Engineering, Institute of Engineering Research, Jiangxi University of Science and Technology, ACS Publications.

* cited by examiner

ICP-OES Analysis Results (mg/L)

| Solution | Ni | Co | Mn | La | Ce | Pr | Nd | Al | Fe | Ca | Mg | Cr | Zn |
|---|---|---|---|---|---|---|---|---|---|---|---|---|---|
| Leachate | 83008.7 | 5446.8 | 4655.8 | 22537.0 | 56.0 | 415.0 | 1977.0 | 51.0 | 0.2 | 81.0 | 527.5 | 2.2 | 187.9 |
| Impurity Removed | 78788.8 | 6120.9 | 3447.5 | 0.8 | 4.4 | 2.9 | 8.7 | 2.8 | 0.8 | 2.6 | 332.5 | 2.3 | 133.1 |
| Final (excess Na2SO4 removed) | 70886.7 | 5547.1 | 3144.8 | 0.7 | 0.5 | 0.4 | 1.0 | 3.4 | 0.7 | 3.5 | 311.1 | 2.2 | 122.1 |

Fig. 2

NICKEL-METAL HYDRIDE (NiMH) BATTERY RECYCLING

BACKGROUND

Electrical energy storage is a continually improving technology field driven by increased demand for portable electronics, electrical vehicles (EVs) and portable power (e.g. tools and equipment) applications. Lithium-ion batteries have evolved to a dominant position for short to medium-term, high discharge uses. Lithium-ion batteries employ a variety of battery chemistries, typically metals combined with a conductive powder and binder. Various battery chemistries have evolved based on technological advancement, usage demands, and resource availability, as the metals employed in the battery charge material are often mined at considerable cost. Nickel-Metal Hydride (NiMH) batteries represent a transitional technology once favored for certain secondary (rechargeable) battery applications. NiMH batteries have been surpassed for most applications by more modern battery chemistries, such as Nickel Manganese Cobalt (NMC) and similar battery chemistry applications.

SUMMARY

Configurations herein demonstrate beneficial enhancements resulting from recycling nickel-metal hydride (NiMH) batteries to extract substantially pure nickel, including adding a leach agent to granular cathode and anode material resulting from agitation of the NiMH batteries to form a leach solution. A pH of the leach solution is maintained for precipitating iron, aluminum and lanthanide rare earth elements (REE) for yielding a nickel solution for forming a cathode material precursor in a recycled battery, often with a high nickel content.

Configurations herein are based, in part, on the observation that emerging uses of rechargeable batteries, particularly in the EV market, introduce a large volume of batteries that typically endure a roughly 10 year lifespan. Unfortunately, conventional approaches to battery usage are emerging as a stream of batteries with older, obsolete charge materials. These older batteries, such as NiMH batteries, include large amounts of nickel comingled with other metals that are no longer desirable in modern batteries. Accordingly, configurations herein substantially overcome the shortcomings of expiring battery chemistries by providing a recycling approach that produces a nickel charge material precursor suitable for use with newer batteries while removing unneeded, unnecessary and/or contaminant metals such as lanthanide REEs including La, Ce, Pr and Nd. The result is a nickel rich solution that may be directly incorporated in the formulation of various battery chemistries (molar ratios) for NMC and other recycled batteries.

In further detail, a method of recycling nickel-metal hydride (NiMH) batteries includes receiving or producing a recycling stream including the NiMH batteries, and agitating (grinding, crushing, etc.) the batteries to generate granular cathode and anode material in a comingled form. A leach agent is added to the granular cathode and anode material resulting from agitation of the NiMH batteries to form a leach solution. Adjustment of a pH of the leach solution maintains the pH of the leach solution at various levels for precipitating iron, aluminum and lanthanide rare earth elements and yielding a nickel solution for forming a cathode material precursor. The resulting recycled cathode material precursor takes the form of a nickel sulfate solution, which can have a Ni concentration, for example, of between 1.1 M to 1.7 M.

BRIEF DESCRIPTION OF THE DRAWINGS

The foregoing and other features will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles of the invention.

FIG. 2 is a chart of an analysis of the resulting materials including intermediate solution (recycling) steps.

DETAILED DESCRIPTION

Figure 1:
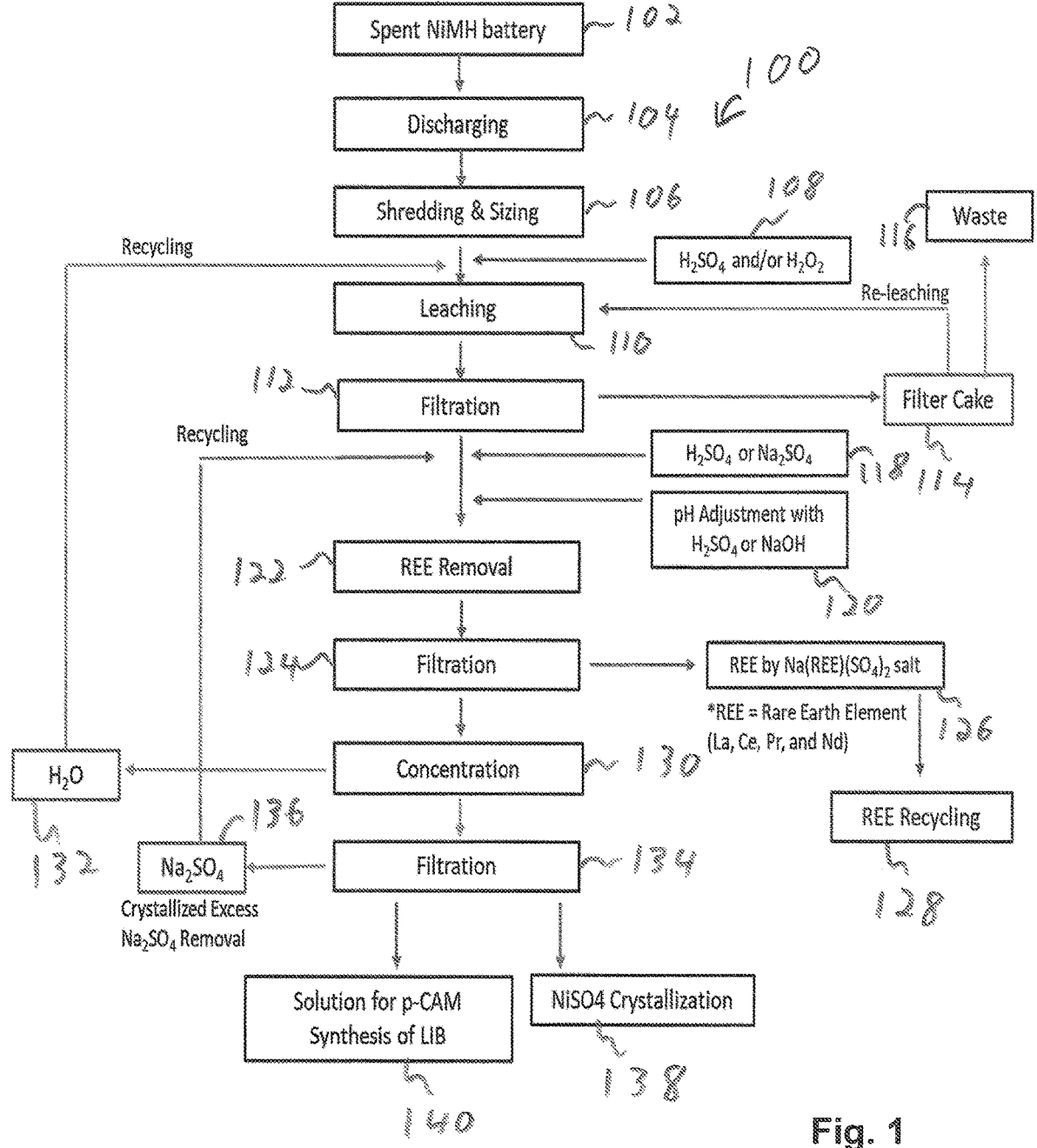
FIG. 1 is a process flow for recycling NiMH batteries according to configurations herein.

Depicted below is an example method and apparatus for recycling batteries such as NiMH batteries for isolating the highly sought nickel from contaminants and obsolete charge material metals such as the lanthanide elements. Recycled batteries result from a stream of end-of-life, sometimes referred to as exhausted or spent, batteries that are no longer serviceable. Often this means that the charge material in the batteries has lost an ability to hold a sufficient electrical charge or may be a battery with newer material that has become unserviceable due to a vehicle accident, manufacturing error, or other inability to perform.

Nickel metal hydride (NiMH) batteries are increasingly ubiquitous having been used in applications like phones, laptops, power tools and electric vehicles. End of life NiMH batteries can still serve as a source of raw metals for preparation of cathode active materials for various chemistries of recycled batteries (i.e., batteries that are prepared from recycled materials). The main elements present in NiMH batteries are generally 17.9 wt % nickel, 4.4 wt % cobalt and 17.3 wt % REEs such as lanthanum, cerium, praseodymium and neodymium. The metals in NiMH batteries present a potential environmental hazard if the spent batteries are simply discarded without special treatment, and the nickel may be toxic to humans and is considered to be a carcinogenic metal. Therefore, recycling of spent NiMH batteries is beneficial for both environmental protection and conservation of natural resources.

The recycling stream includes valuable raw materials which must first be dismantled, usually by physical crushing, grinding and/or shredding of the entire battery casing, current collectors, cathode and anode material, and any other electrical connectors and circuits that may interconnect the individual cells of the battery. The recycling stream therefore has a somewhat indetermined composition of comingled cathode materials, anode materials, and current collectors, in addition to physical casing such as plastic and other containment. Various physical separations may occur and will often result in a granular mixture of electrode material or "black mass" encompassing both cathode and anode material from the recycling stream. Cathode and anode materials including nickel and lanthanide elements (including La, Ce, Pr, Nd) and various other metals are addressed by the approach disclosed below.

A particular configuration, discussed further below, provides an economical and environmentally beneficial recycling method for NiMH batteries. A narrative description is as follows. In a specific example, the black mass is leached in sulfuric acid solutions (2-5 molarity) and addition of hydrogen peroxide to the solution enhances further leaching of the metal ions of interest and precipitates impurities such as aluminum and iron dissolved in the solution by raising the solution pH to 5-6. After solid-liquid separation by filtration, lanthanide rare-earth elements (La, Ce, Pr and Nd) are removed by formation of insoluble sodium REEs double sulfate salts at pH=0-3 by adding sulfuric acid and sodium hydroxide. The goal is an adjustment of Na$^+$ such that a molar ratio of Na/REE is about 15-25 and a molar ratio of SO$_4$/REE is about 35-60, at a solution pH for the salt precipitation. After removal of REEs, the impurity removed solution is further tuned by concentration and selective crystallization of excess sodium sulfate. While the sodium sulfate is selectively crystallized, REEs are also further removed. The solution reaches a desired nickel concentrations for precursor synthesis of cathode active materials, or for isolation of nickel sulfate product for many applications. The separated REEs can be fed to REE recycling stream to recover the valuable rare-earth elements.

FIG. 1 is a process flow 100 for recycling NiMH batteries according to configurations herein. The general process recycles nickel-metal hydride (NiMH) batteries using a leach agent in combination with granular cathode and anode material resulting from agitation (physical grinding, crushing, and/or shredding) of the NiMH batteries to form a leach solution. Sulfuric acid with or without hydrogen peroxide is a preferable leach agent for REE removal, however other leach agents may be employed. The pH of the leach solution is regulated and maintained for precipitating iron, aluminum and lanthanide REEs for yielding a nickel solution for forming a cathode material precursor.

In more detail, at step 102, a recycling stream including the NiMH batteries is received, and discharged to eliminate an arcing or combustion risk from residual charge, as depicted at step 104. Recall that Li-ion batteries are beneficial due to an ability for high discharge, therefore even "dead" batteries can retain significant electrical energy. A dismantling or shredding process agitates the batteries to generate the granular cathode and anode material, and separation and sizing of the granular particles may occur, as disclosed at step 106. The result is a black mass from the recycling stream including granular cathode and anode material resulting from agitation of the NiMH batteries.

The leach agent, which includes sulfuric acid with or without hydrogen peroxide, is added at step 108. For example, the sulfuric acid concentration for leaching is between 1 M to 5 M, preferably 2-3 M, and the hydrogen peroxide (about 30-34% concentration) attains a ratio of between 0.2-0.6 in volume to the weight of black mass, preferably 0.3-0.4. Preferably, the pH of the leach solution is brought to around 5-6, while hydrogen peroxide is a relatively small amount. The leach solution is stirred for approximately 5 hours or overnight while maintaining a pH of the leach solution between 5-6 for precipitating impurities including iron and aluminum from the leach solution, as depicted at step 110. If the pH is lower than 5, the pH is adjusted to 5.5 to remove Al and Fe impurities and to minimize loss of Ni.

Precipitated Al and Fe is filtered, as shown at step 112, and may result in a filter "cake" at step 114, which becomes a waste stream at step 116 or may incur additional leaching. Following filtering of the leach solution to remove the precipitated solids, a calculated amount of sulfuric acid using concentration between 93%-98% is added to be sulfate to REE ratio=35-60. And then, sodium hydroxide of a concentration between 25%-50% is added until the pH reaches between 1-3 to precipitate the REE remaining in the leach solution as depicted at step 118. Sodium sulfate, instead of using only H$_2$SO$_4$, can be used to match the ratio of SO$_4$/REE=35-60 as shown at steps 120 and 136, as needed amount of sulfuric acid and/or sodium hydroxide is added to maintain the pH for sodium REE double sulfate precipitation. Lanthanide rare-earth elements (such as La, Ce, Pr and Nd) precipitate at step 122, and are removed by filtration (step 124) as lanthanide-alkali double sulfate salt at pH 0-3, preferably pH=2, at step 126. The REEs may enter an alternate recycling stream, as depicted at step 128, as rare earths generally are considered a valuable commodity.

As an example, REE removal includes establishing an alkali to REE molar ratio of between 15-25, and a sulfate to REE ratio of 35-60 for REE removal by lanthanide-alkali double sulfate salt. In order to form insoluble sodium REE double sulfate salt (Na(REE)(SO4)2) to remove the REE, sulfate is added in the molar ratio of 35-60 to the number of moles of REE in the leach solution. In order to match the ratios, a calculated amount of concentrated sulfuric acid is added to the Al & Fe removed leachate, and then the pH of the solution is brought up to 1-2 to precipitate lanthanide-alkali double sulfate salts. It should be further noted that the use of sulfuric acid aids the sulfate formation of the lanthanides.

The resulting leach solution with the REEs removed is concentrated to ≥1.2M Ni, as depicted at step 130. Excess alkali sulfate during the concentration is removed by selective crystallization dependent on the Ni concentration, as shown at step 136. Sodium sulfate 136 results, and extracted water may be reused, as shown at step 132. Once the crystallized excess sodium sulfate 138 is filtered at step 134, the nickel ion concentration should be between 1.1 M-1.7 M, suitable for synthesis in Li-ion batteries, at step 140.

A particular example may be illustrative, as follows. 250 g of black mass of NiMH batteries is leached in 1500 mL of 2 M sulfuric acid solution by adding the black mass slowly to the solution at room temperature, and then 98 mL of 34 wt % H$_2$O$_2$ is added dropwise to the solution. The solution is then stirred overnight. The solution mixture is filtered to separate the un-dissolved and impurity precipitate solids from the leachate. A dark green leachate (pH=5.7) is obtained. Since the solution pH is in an acceptable range for removal of aluminum and iron impurities, no further pH adjustment was done for removal of Al and Fe. Then, in order to remove REEs, 175 mL of 95-97% sulfuric acid is added to the solution and the solution pH is raised to 2 by adding 200 mL of 50% NaOH solution; sodium REEs double sulfate salt is precipitated as white crystalline powder while raising the solution pH. This white precipitate is separated out by filtration. The purity of the solution is analyzed by ICP-OES (Inductively coupled plasma-optical emission spectrometer) shown below in FIG. 2. The solution is concentrated to remove excess sodium sulfate in the solution by selective crystallization of Na$_2$SO$_4$ and filtration and to bring the nickel ion concentration to the range of 1.1 M-1.7 M.

FIG. 2 is a chart of an analysis of the resulting materials including intermediate solution (recycling) steps. Referring to FIGS. 1-2, a chart 200 depicts the leach solution at the stages of the leaching 210, from step 110, impurity removal 220 after steps 112 and 124, and the final nickel sulfate solution 230 of step 140.

The nickel sulfate solution may be used to form a precursor for recycled cathode material in a new battery. Cathode materials include a predetermined ratio of metals such as lithium, nickel, manganese, cobalt, aluminum, iron and phosphorous, defining a so-called "battery chemistry" of the Li-ion cells. The preferred battery chemistry varies between vendors and applications, and recycling efforts of Li-ion batteries typically adhere to a prescribed molar ratio of the battery chemistry in recycled charge material products. Industry trends are moving towards a more nickel-rich chemistry, often preferring nickel, manganese and cobalt (NMC) in molar ratios of N:M:C such as 5:3:2 (532), 6:2:2 (622) and 8:1:1 (811).

Solution forms of cathode material, such as sulfates of nickel, manganese, cobalt and aluminum, may be combined for a ratio adjustment to generate recycled cathode precursor corresponding to a battery chemistry of 811, 622 or 532 as discussed above, or other molar ratio combinations. The nickel sulfate recycled as disclosed herein is combinable with other sulfate forms of cathode materials to form a cathode precursor of a predetermined battery chemistry. The precursor is typically a powder form which is sintered with lithium for generating an active cathode material for adherence to a current collector to form an electrode in the new, recycled batteries. When combined with sulfate forms from older, low nickel content recycling streams, the disclosed nickel sulfate complements the higher nickel ratios such as 622 and 811 of the new recycled batteries.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of recycling nickel-metal hydride (NiMH) batteries, comprising:
   combining a leach agent and granular cathode material resulting from agitation of the NiMH batteries to form a leach solution; and
   adjusting or maintaining a pH of the leach solution to between 5 and 6 for precipitating and removing impurities comprising iron, aluminum and lanthanide rare earth elements (REE) for yielding a nickel solution.

2. The method of claim 1 wherein the leach agent comprises sulfuric acid.

3. The method of claim 2 wherein the leach agent further comprises hydrogen peroxide.

4. The method of claim 1 wherein the pH of the leach solution is adjusted to between 0 and 3 for removing the REEs.

5. The method of claim 1 wherein the granular cathode material is comingled with casing, current collectors and anode material in a black mass.

6. The method of claim 1 wherein the yielded nickel solution has a nickel ion concentration in a range between 1.1 M-1.7 M.

7. The method of claim 1 wherein the lanthanide rare earth elements include La, Ce, Pr and Nd.

8. The method of claim 1 further comprising:
   receiving a recycling stream including the NiMH batteries; and
   agitating the batteries to generate the granular cathode material.

9. The method of claim 1 further comprising forming a cathode material precursor from the nickel solution.

10. A method of recycling nickel-metal hydride (NiMH) batteries, comprising:
    combining a leach agent and granular cathode material resulting from agitation of the NiMH batteries to form a leach solution;
    adjusting or maintaining a pH of the leach solution for precipitating impurities comprising iron, aluminum and lanthanide rare earth elements (REE) for yielding a nickel solution;
    stirring the leach solution for at least 5 hours for dissolving nickel and cobalt in the leach solution;
    following dissolution of the nickel and cobalt, adjusting or maintaining the pH of the leach solution between 5 and 6 for precipitating Fe and Al; and
    filtering precipitated impurities including the Fe and Al for recovering the dissolved nickel and cobalt in the leach solution.

11. The method of claim 10 further comprising, after filtering the precipitated impurities,
    reducing the pH to between 0-3 for precipitating the lanthanide elements; and
    filtering the lanthanide rare earth elements as a sodium double sulfate salt.

12. The method of claim 10 further comprising, after filtering the precipitated impurities,
    adding at least one of sulfuric acid and sodium hydroxide for adjusting sodium ions to a molar ratio of 15-25 with the lanthanide rare earth elements and $SO_4$ to a molar ratio of 35-60 with the lanthanide rare earth elements; and
    removing excess sodium sulfate.

13. A method of recycling nickel-metal hydride (NiMH) batteries, comprising:
    receiving a black mass in a recycling stream including granular cathode material resulting from agitation of the NiMH batteries;
    adding sulfuric acid of a 2-5 M concentration to the black mass to form a leach solution;
    adding hydrogen peroxide in an amount of 0.2-0.6 volume ratio to the weight of black mass to the leach solution;
    stirring the leach solution for at least 5 hours while maintaining a pH of the leach solution between 5-6 for precipitating impurities including iron and aluminum from the leach solution;
    filtering the leach solution to remove precipitated solid of the impurities;
    adding sulfuric acid of a concentration between 93%-98% and sodium hydroxide of a concentration between 25%-50% to adjust the pH of the leach solution between 1-3 for precipitating REEs (rare earth elements) remaining in the leach solution;
    precipitating a double sulfate salt of the REEs as a crystalline powder;
    filtering the REEs from the leach solution; and
    crystallizing excess sodium sulfate to achieve a nickel ion concentration between 1.1 M-1.7 M in the leach solution.

* * * * *